United States Patent Office 3,580,789
Patented May 25, 1971

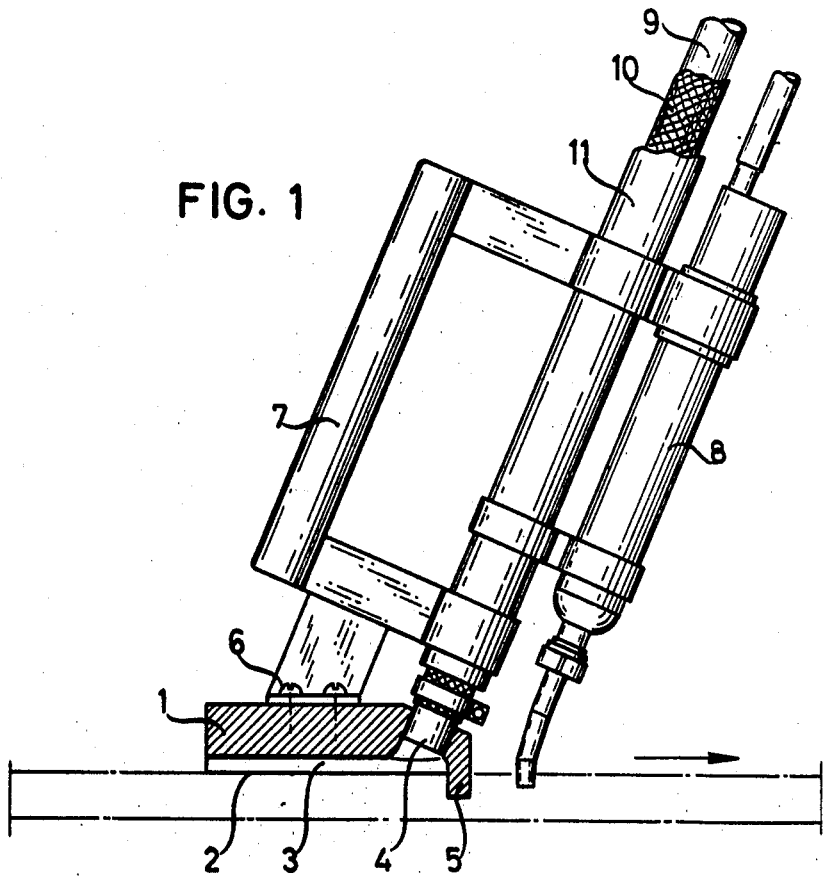
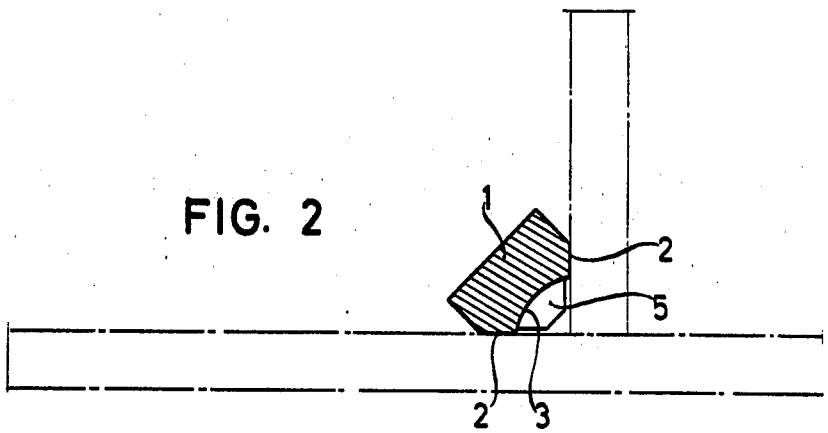

3,580,789
WELDING GEAR FOR OBJECTS OF THERMOPLASTIC MATERIAL
Günter Wenzel, Kelkheim, Taunus, Germany, assignor to Farbwerke Hoechst Aktiengesellschaft vormals Meister Lucius & Bruning, Frankfurt am Main, Germany
Filed July 9, 1968, Ser. No. 743,487
Claims priority, application Germany, July 25, 1967, F 53,049
Int. Cl. B32b 31/30
U.S. Cl. 156—497         5 Claims

ABSTRACT OF THE DISCLOSURE

The spout or shoe of a welding gear for objects of thermoplastic materials, by means of which fully plasticized welding material is brought into a prepared welding gap, comprises, between two lateral guide surfaces, a smoothing face, a connection for the supply of the welding material and at its leading end a nose projecting into the welding gap.

---

This invention relates to gear for welding thermoplastic components, and especially for welding thick-walled semi-finished products of plate or tubular shape into housings and ducts or into parts of apparatus and machines.

According to known practice, polyethylene extrusions which freely issue at welding temperature from a screw-type extruder are brought between two reel-fed polyethylene film webs, and the films subsequently welded by being passed against one another. The extrusion issuing from the screw-type press has a diameter of about 1.6 mm.; its own heat is sufficient to fuse and join the mutually facing surfaces of the films which have a thickness of .04 to .25 mm. This so-called "Molten bead heat-sealing" method is not applicable in the case of synthetic sheets and other semi-finished products the thickness of which is of a far higher order of magnitude, because the inherent temperature of the bead is not sufficiently high to carry out the welding operation. This is true even if a thicker extrusion is used.

If thick-walled components of this nature are to be joined it is necessary for the fully plasticised welding material to be pressed into a seam location—for example, an edge, gap or groove—conditioned by mechanical treatment and by heating. For this reason the welding material is applied to the weld seam location, for example a prepared groove, not from a freely flowing extrusion, but issuing from a flexible, heatable pressure duct. The result of this process, i.e. the quality and the appearance of the welding seam, essentially depends upon the skill of the welder. In practice it was found that even the skilled welder—especially in a confined space—is not always able so to control, direct and apply the welding material at the same time that a thoroughly homogeneous seam of uniform appearance is produced.

Now it has been found that these disadvantages could be obviated by welding gear in which a spout or shoe has, between two lateral guide surfaces, a smoothing face, a connection for supplying the welding material and, at the leading end of the spout, a nose projecting into the welding gap.

In such an arrangement the welding material, extruded from a duct under pressure and entering the spout, effects and, at the same time, regulates the advance of the welding gear in dependence on the supply of welding material. This surprising effect is apparently brought about because the compressed welding material encounters a frictional resistance in the space formed by the spout and the welding gap and confined laterally by the guide surfaces which is greater than the sliding friction of the spout on the workpiece.

By exploiting this effect, the welding operation is greatly facilitated. All the welder has to ensure, while applying the welding gear, is that the guide surfaces bear sufficiently closely on the workpiece. The weld exhibits uniform density and smoothness even if the flow of welding material should fluctuate.

The welding gear is preferably designed in such a way that the spout is detachably connected to the handle, for example by using screw or plug-in connections of known type. In this way it becomes possible to provide the welding gear with the kind of spout that corresponds to the shape, size and position of the seam. For this purpose, spouts with concave, flat or convex smoothing surface and spouts with variously shaped and angled guide surfaces may be kept as ready accessories.

The guide surfaces should match the walls as regards shape and inclination. For example, if flat synthetic sheets are to be welded which are perpendicular to one another, a spout with plane guide surfaces at right angles is the most suitable. When butt-welding pipes of small diameter, curved guide surfaces matching the pipe diameter may be used.

The nose projecting into the welding gap should be narrower and smaller than the gap profile, because the nose should not rub against the lateral surfaces and the base of the joint which has been pre-heated by the burner and initially fused at least on the surface.

The material from which the spout is produced should have low friction characteristics and be a poor heat conductor. Synthetic materials such as polytetrafluoroethylene and ceramic materials such as porcellaine possess these properties in the correct relationship.

Machines used for preparing and conveying the welding material may be presses of known type such as screw-type presses, piston presses or pumps. The most suitable are presses of the so-called extruder type. With these machines the welding material can be prepared by mixing, plastification and compression from granulate and be finally urged into a flexible duct connected to the welding gear.

The drawing illustrates the device of the invention by way of example.

FIG. 1 shows in longitudinal section the spout and other components of the welding gear;

FIG. 2 shows in cross-section the spout and its position relative to the welding joint.

The spout or shoe is indicated at 1. Between the guide faces 2 is a smoothing surface 3, the supply connection 4 for the welding material and, at the leading end of the spout, the nose 5. The spout 1 is connected to the handle 7 of the welding gear by means of screws 6. Associated with the handle is also a hot-air generator 8 and the hose 9 with heater braid 10 and insulation 11. The dash-dot lines indicate the profiles of polyethylene sheets which are perpendicular to one another and are to be joined by means of a convex fillet weld. The guide surfaces 2 extend parallel with the planes of the sheets. The lateral edges of the nose 5 are re-entrant relative to the guide surfaces, and the point of the nose clears the base of the joint. The smoothing surface 3 is concave to match the desired shape of the weld.

After connecting the hose heater 10, the hot-air generator 8 and after regulating the supply of welding material, the welding operation may commence. The welding material entering the spout 1 via the connection 4 advances the spout with the whole welding gear in the direction of the arrow.

The extruder which produces and conveys the welding material has not been shown. For welding polyethylene sheets, a single-screw heatable extruder with infinitely variable drive was used. This extruder was connected to a spout of the above-described type through a heatable hose having a 16 mm. bore. The thickness of the sheet was approximately 20 mm. The welds obtained were of uniform density and smooth surface appearance.

We claim:

1. A welding gear for thermoplastic objects by means of which fully plasticized welding material is transferred to a prepared welding gap, comprising supply means for supplying the welding material to the gap, a shoe having confining means for confining the supplied welding material to regulate the advance speed of the gear in accordance with the rate of supply of the welding material, said confining means including a pair of lateral guide surfaces whose faces slide along the surfaces of the objects to be welded, a smoothing surface between said guide surfaces, a nose at the leading end of the shoe for projecting in the welding gap, and said supply means having its discharge connection located at the juncture of said guide surface and said nose whereby the welding material fed thereto causes the gear to move in a forward direction.

2. The welding gear of claim 1, in which the shoe is attached to a handle by a detachable connection.

3. The welding gear of claim 1, in which the guide surfaces match the shape and inclination of the walls immediately adjacent the welding gap.

4. The welding gear of claim 1, in which the shoe is made from polytetrafluorethylene.

5. The welding gear of claim 1, in which the guide surfaces are disposed in planes perpendicular to each other, and the smoothing surface is an arcuate surface bridging the guide surfaces.

References Cited

UNITED STATES PATENTS

| Re. 24,801 | 3/1960 | Kaminsky | 156—497 |
| 2,372,737 | 4/1945 | Phillips | 156—497 |
| 3,015,601 | 1/1962 | Fener | 156—515 |
| 3,279,971 | 10/1966 | Gardener | 156—500 |

SAMUEL W. ENGLE, Primary Examiner

R. E. HART, Assistant Examiner

U.S. Cl. X.R.

156—500